United States Patent Office 2,816,641
Patented Dec. 17, 1957

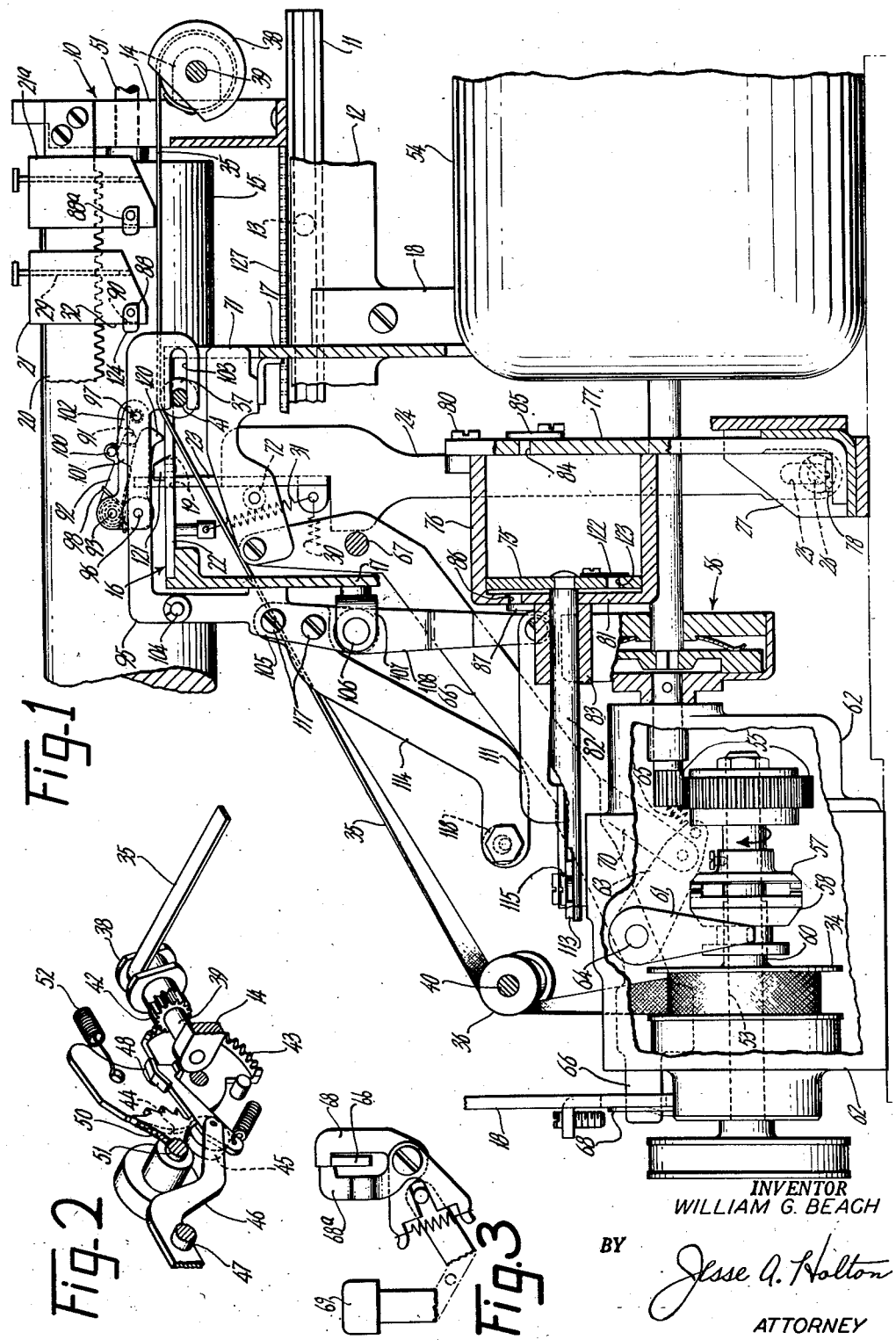

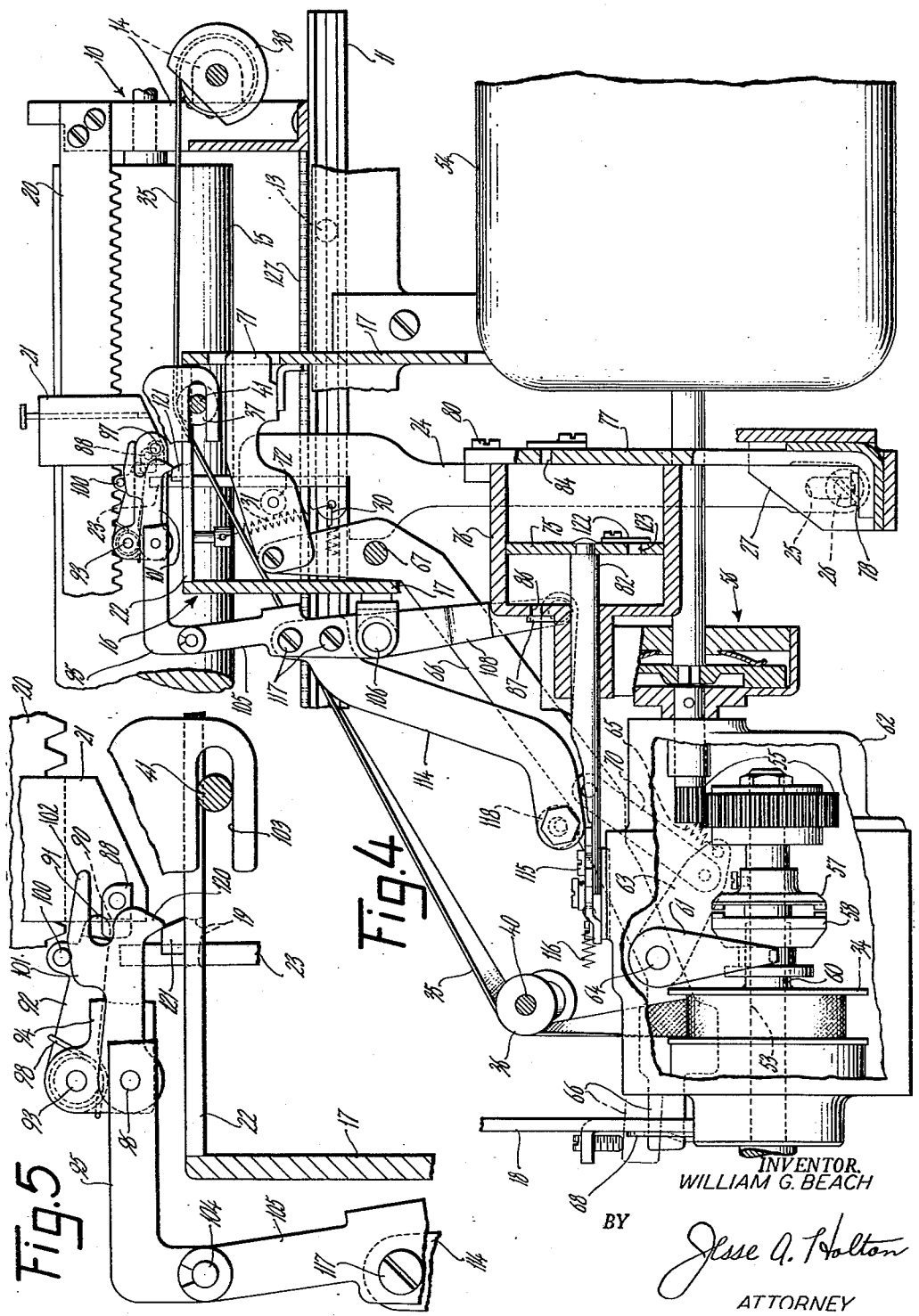

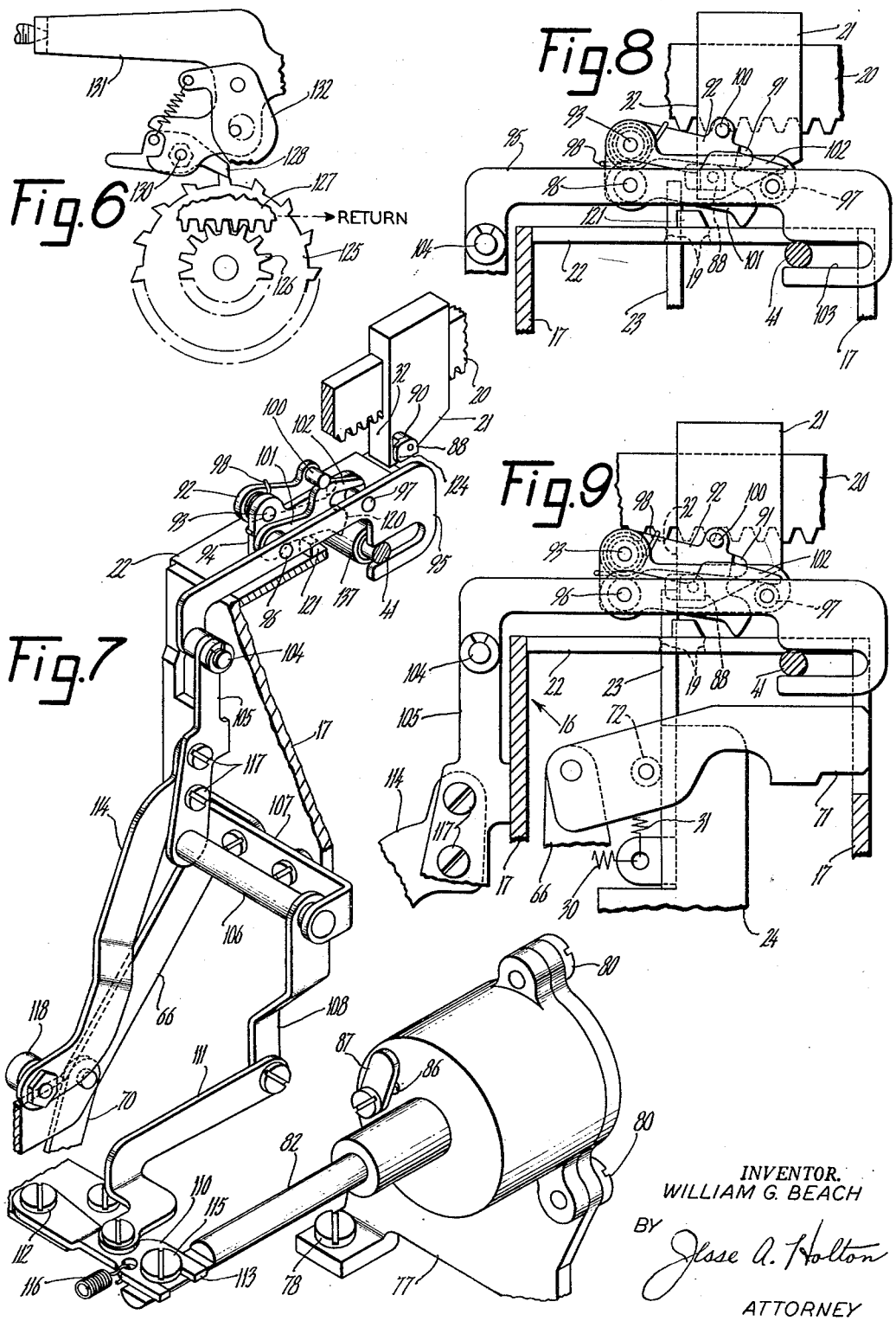

2,816,641

POWER MOVEMENT CONTROL FOR BUSINESS MACHINE

William G. Beach, Newington, Conn., assignor to Underwood Corporation, New York, N. Y., a corporation of Delaware Application December 14, 1955, Serial No. 553,097

11 Claims. (Cl. 197—66)

This invention relates to business machines, such as typewriters, which embody a carriage and involve motor-operated means to effect the movement of such carriage to one or more given positions. More particularly, the invention pertains to features in association with such motor-operated means whereby carriage movements to given positions, particularly when of considerable length, are effected with accuracy and efficiency, and with a minimum of attendant shock and noise.

The invention in some respects has relation to an application of Charles B. Letterman, Serial Number 533,337, filed September 9, 1955, and it may be regarded to constitute an improvement thereover.

In particular distinction from the aforestated application, the mechanism of the present invention comprises a primary and a secondary shut-off mechanism for a motor-operated carriage moving means, functioning respectively in connection with carriage movements that are relatively long and short, the secondary shut-off mechanism being constituted to function at the end of the carriage run if the primary shut-off means due to the shortness of the required movement is not called into operation. Furthermore, in conjunction with the primary shut-off means only, a carriage slow-down device comes into play to reduce appreciably the speed of the carriage, the sum effect being that in connection with movements of appreciable extent, the carriage in its final approach to a given position coasts, unpowered, a terminal portion of its run at greatly reduced speed, and is finally arrested without substantial shock and noise. The speed of the carriage is reduced by the slow-down means appreciably below the speed at which the motor means is capable of driving the carriage, but the reduced speed is sufficient so that the carriage will conclude its movement reliably by power of the momentum.

Carriage returns below a certain magnitude involve only the secondary shut-off means which is constituted to function as the carriage is moved by the motor-operated means at the very end of the required run. The secondary shut-off means thus functions reliably by the force of the motor-operated means and comes into play only for short carriage runs, namely for runs in which the motor-operated means is not active sufficiently long to accelerate the carriage to acquire a momentum productive of appreciable shock and noise as the run is limited.

The stated primary slow-down means which functions in connection with longer carriage runs is easily adjustable for proper slow-down action so that the carriage will coast reliably, yet softly, to the limit of the required movement.

In accordance with the aforestated general concept, it is a general object of the invention to provide efficient, simple and improved means whereby a carriage by means involving motor-operated means may be reliable and expeditiously moved to a given position, through a great or small distance, without at the terminus of the movement producing objectionable shock, noise and strain.

It is a more specific object of the invention to terminate short power runs of the carriage reliably by the positive action of the motor power used in effecting such runs, and in connection with movements of the carriage beyond a certain magnitude to effect motor-operated movement of the carriage short of the position intended to be reached and with an attendant reduction of speed to let the carriage coast softly to a limit terminus of its run for arrest with a minimum of shock and noise.

It is a further object of the invention to provide a mechanism for the purpose stated which is easily adjustable for efficient operating characteristic.

A still further object of the invention is to provide for a motor-operated carriage moving means, a shut-off means which incidental to runs of the carriage beyond a certain length functions before the carriage reaches the intended limit position, and which shut-off means has associated therewith a device to reduce the speed of the carriage substantially incidental to shut-off action.

The motor-operated means in the specific embodiment of the invention disclosed herein is in the nature of a motor-operated carriage return and line-spacing mechanism and the aforestated objects apply more specifically also to mechanism of this kind.

Trouble has been experienced in connection with motor-operated carriage return mechanisms due to frame and other parts straining and yielding incidental to the violent arrest of the carriage after long returns, causing the escapement to take over the control of the carriage so as to settle often one letter-feed space beyond the required line-start position.

It may thus be considered a further object of the invention to provide an efficient mechanism whereby the escapement after long as well as short power returns regains control over the carriage to bring it to rest in the exact required letter-feed position, the said mechanism embodying a return shut-off means which for long carriage returns functions before the carriage reaches the return position, and the machine including also means automatically operative near the termination of long return runs, to reduce the return speed of the carriage and thereby to eliminate undue straining of parts resultant in inaccurate carriage positioning.

Other objects and features will be in part obvious and in part pointed out particularly as the following description of a preferred embodiment of the invention proceeds.

The invention is illustrated as embodied in an Underwood All Electric typewriter, and referring to the drawings, Figure 1 is a fractional rear elevation showing a work sheet supporting carriage, along with a power return mechanism for said carriage being idle and comprising the primary and the secondary return shut-off mechanism, as well as the carriage-slow-down device of the invention.

Figure 2 is a front perspective view of a line spacing device provided on the left end of the carriage.

Figure 3 is a diagrammatic right-hand side elevation of a conventional mechanism for tripping the power return mechanism into action.

Figure 4 is a rear elevation similar to Figure 1, showing the carriage nearing the end of a relatively long return run, a carriage return limiting margin stop having just operated the primary carriage return shut-off mechanism, and the speed of return of the carriage, due to an operation of said slow-down device having been greatly reduced.

Figure 5 shows in an enlarged scale a portion of Figure 4.

Figure 6 is a fractional plan view of the condition of a carriage escapement mechanism at the instant the carriage reaches the limit of its return after a long run and reverses its motion.

Figure 7 is a rear perspective view of the carriage slow-down device along with parts of the primary carriage return shut-off mechanism, all parts being in normal positions.

Figure 8 is a rear elevation similar to Figure 5, the carriage being in an initial typing position, advanced from the return limit, and the carriage slow-down device being idly disposed.

Finally, Figure 9 is also a rear elevation similar to Figure 5, the carriage having been returned to the full limit, and the slow-down device having been restored to an idle position.

Referring now more particularly to Figure 1, a work sheet supporting carriage 10 includes a usual grooved rail 11 guided in a stationary trackway structure 12 through the medium of usual anti-friction elements 13. The said carriage 10 includes, rising upwardly from said rail, two spaced ends 14 of which in Figure 1 only the left-hand one is shown. Turnably supported in said carriage ends 14, and extending therebetween parallel to the rail 11 is a platen roll 15. The trackway structure is part of a machine framework which at the middle of the machine includes a relatively narrow mechanism housing 16 having opposite side walls 17. The housing 16 is flanked, substantially equally distant to each side thereof, by two main side walls 18 of which only the right-hand one is shown in Figure 1. A rack bar 20 fastened to the carriage ends 14 and generally coextensive with the carriage, supports a carriage return limiting margin stop 21, the said stop having a lock 29 releasably meshing with the rack of the bar 20 to facilitate adjustment of the stop along the rack bar 20 to different return-terminating positions. Projecting upwardly through a rectangular perforation 19 in a top plate 22 of the housing 16, see Figures 1 and 4, is a counterstop 23 by cooperation with which the margin stop 21 limits return runs of the carriage. The said counterstop 23 is part of an upright arm 24 which at its lower end has a slot 25 accommodating it upon a headed pin 26. The latter has support on a bracket 27 forming part of the machine framework. Springs 30 and 31, see Figures 1 and 4, have the combined effect of normally maintaining the counterstop resiliently in an upward limit position defined by the lower end of the slot 25 and, as seen from the front of the machine, laterally to the right limit within the perforation 19 in said top plate 22. In the extreme return position of the carriage a face 32 of the margin stop crowds the counterstop 23 solidly against said right side of the perforation 19, that is the left side when viewed as in Figure 1.

In the illustrated embodiment of the invention, a power carriage return drive mechanism of usual structure is employed, and includes a drum 34 for winding a carriage return drawband 35 which leads over idler pulleys 36 and 37 to a line space mechanism actuating drum 38, see Figures 1 and 2. The drum 38 is turnably supported on a shaft 39 which is fast on the left one of the carriage ends 14. The stated idler pulley 36 is supported on a stationary stud 40, and the idler pulley 37 is carried on a stud 41 which is fast on a rear wall of the housing 16. The line space actuating drum 38 has unitarily turnable therewith a pinion 42 which is in mesh with a gear sector 43 embodying a cam face 44. A roller 45 is borne on an arm 46 having pivotal support at 47 on the adjacent carriage end, and the said arm 46 carries concentrically with said roller 45 a line space pawl 48 for action on a usual line space ratchet wheel 50 which is fast on a shaft 51 having the platen roll 15 fast thereon to turn therewith. The said gear sector 43 with its cam face 44, under the tension of a spring 52, occupies normally the position seen in Figure 2. Pull on the drawband 35 actuates the sector 43 against a limit stop, not shown, and the line space pawl 48 thereby becomes actuated to advance the ratchet wheel 50 and thus to line space to the platen 15. The drawband operating drum 34 is normally under the very light bias of a spring, not shown, to take up all slack in the drawband 35, but insufficient to actuate the line space drum 38 from the normally prevailing position. To actuate the drawband 35 for line spacing and/or carriage returning operation, the said drum 34 is adapted to be coupled to a shaft 53, which while the machine is in use is constantly driven by an electric motor 54 through speed reduction gearing indicated at 55. A slip clutch 56 is interposed between said motor 54 and said gearing 55 for permitting the carriage temporarily to be slowed down without strain on the motor and the carriage return drive parts leading to the carriage. The drum 34 is connectable for operation by the shaft 53 through a normally open clutch having a driver member 57 fast on the shaft 53 and having another member 58 splined on a bushing 60 of the drum 34 for movement axially of the shaft 53 into engagement with the clutch member 57. The clutch member 58 is shiftable into engagement with the driver member 57 by a fork arm 61 reaching into an annular groove of the clutch member 58. The parts 34, 55, 57, 58 and 61 are all mounted on or contained in a housing 62 carried fast on the general framework of the machine. The fork 61 and an arm 63 are unitary with a shaft 64 which is pivotally mounted in the housing 62. A spring 65 associated with the arm 63 tends constantly to rock the structure 61, 63 to clutch engaging position, counterclockwise with reference to Figure 1. However, in a usual manner, a control lever 66, pivoted on a stud 67 in the housing 16, and having a link connection 70 with the arm 63, is normally held in the Figure 1 position, against movement by a latch 68, see Figures 1 and 3, so that the said clutch members 57, 58 are normally held in open-clutch relation. Release of the latch 68 is effected by operation of a carriage return key, indicated at 69, substantially as described in the patent to Sagner No. 2,541,295 dated February 13, 1951, or under carriage control, in a manner also well known. Upon release of said latch 68, the spring 65 effects a clutch closing movement of the fork 61, inasmuch as the lever 66 is then free to execute a clockwise movement in respect to the showing of Figure 1. From the upreaching end of the lever 66 there extends lengthwise of the carriage a link 71 which carries a pin 72. In the normal position of the lever 66 the pin 72 has the position seen in Figure 1, wherefore with reference to such figure the counterstop arm 24 is normally spring drawn to the leftward limit in the perforation 19. When the lever 66 is moved under the power of the spring 65, it displaces the counterstop arm 24 rightwardly in respect to Figure 1, within the perforation 19. In each power carriage return instituted by the closure of said clutch, the margin stop 21 rides toward the counterstop 23. If the return run of the carriage is instituted with the latter residing at or beyond a certain distance in advance of the return limit defined by the margin stop 21, then, but not otherwise, said margin stop in the power return movement will operate a primary carriage return shut-off mechanism and will also cause the carriage to be subjected to the influence of a carriage slow-down device. The said slow-down device functions over a zone of carriage travel which is in approach of and short of the limiting engagement of the margin stop 21 with the counterstop 23. Moreover, the said primary shut-off means opens the carriage return clutch 57, 58, before the return limit is reached, the slow-down device reducing the speed of the carriage to a point so that the carriage by a residue of momentum residing therein coasts reliably but softly to the limit of its return run. In the embodiment of the invention shown, as will become evident hereinafter, portions of the carriage slow-down device are common with portions of said primary carriage return shut-off mechanism.

The carriage slow-down device includes a dash-pot piston 75 which normally has the position within a cylinder 76 illustrated in Figure 1. A bracket plate 77, secured to the framework of the machine as at 78, furnishes one end of the said cylinder 76, the cylinder being secured to the bracket plate 77 by screws 80. Another end 81 of the cylinder may be integral therewith and a piston rod 82 reaches outwardly through a boss portion 83 of said end 81. The cylinder end afforded by the bracket 77 has a compression controlling port 84, the effective size of which is adapted to be varied by fastening a finger 85 in different-degree covering positions thereover. The end 81 has a vacuum controlling port 86, the effective size of which port is variable by an adjustable finger 87.

The stated piston 75 is actuated from the cylinder end 81 toward the other cylinder end by the movement of the work sheet supporting carriage 10 in approach of but short of the return-limit position. To this end, the margin stop 21 is provided with a rearwardly projecting lug 88 having a face 90 to engage a rounded extremity 91 of a dog 92. The latter is pivotally carried at 93 on a plate 94 which is unitary with a slide 95 and extends parallel to said slide 95, the plate 94 being rigidly united with the slide 95 by spacing studs 96 and 97. The dog 92 has normally the pivotal position seen in Figure 1, wherein its rounded extremity 91 lies in the path of the margin stop lug 88, a torsion spring 98 urging the dog down for a pin 100 thereon to contact limitedly on an arm 101. The said arm 101 is pivotally carried on the spacing stud 96 and has a finger 102 resting normally on the spacing stud 97. The slide 95 is slotted at one end as at 103 for guidance on the same stud 41 which supports the guide roll 37 for the carriage drawband. The other end of the slide, as at 104, is linked to an arm 105 of a bail having a rock shaft 106 pivotally carried in a U-shaped bracket 107. The latter is secured to one of the housing walls 17. The said bail includes further a down-reaching arm 108 having connection with a horizontally swingable arm 110 through a link 111. The said arm 110 is pivoted upon the framework of the machine, as at 112, and at its swinging end has a fork 113 connecting it with a stud 115 on the piston rod 82. The described mechanism, under the tension of a spring 116 attached to the arm 110, is urged to occupy normally the position seen in Figures 1 and 7, wherein the upreaching arm 105 abuts limitedly against one of the housing walls 17.

Whenever the carriage is being returned, as by the described power return mechanism, or by manual effort, the face 90 on the margin stop lug 88 contacts the rounded extremity of the dog 92 about ½" before the margin stop 21 engages the counterstop 23, and carries then said dog, and therewith the slide 95, leftwardly of Figure 1. As the margin stop 21 nears the counterstop 23, a cam nose 120 on the arm 101 is deflected upwardly by engagement with a cam lug 121 provided rigidly upon the housing top plate 22. Consequently the arm 101 is forced upwardly, which by action on the pin 100 carries the dog 92 upwardly to the position seen in Figures 4 and 5. The rounded extremity 91 of the dog 92 has then a position relative to the lug face 90 so that consequential to further return movement of the carriage the dog 92 will yield or slip upwardly out of the way of the lug 88. Therefore, resultant to said dog 92 so yielding, the said spring 116 is enabled to move the slide 95 and the dog immediately to the position shown in Figures 8 and 9, wherefore the dash-pot piston 75 restores immediately to the normal position, fully ready for new operative action.

While the slide 95 in the return movement of the carriage is carried along by the lug face 90, the piston 75 moves rightwardly with respect to Figure 1 to the Figure 4 position. The restraint on the piston within the dash-pot is regulated by adjustment of the port fingers 85, 87, so that the slide 95 is effective to reduce softly and yet quickly the speed of the returning carriage to a degree providing for the coasting of the carriage at moderate speed reliably to the return limit.

It has been stated that certain portions of the carriage slow-down device are common with portions of a primary carriage return shut-off mechanism. These common portions comprise the parts 91 to 98, inclusive, and part 105. The primary shut-off mechanism comprises further a restorer arm 114 for the control lever 66, secured to the arm 105 by screws 117. The said restorer arm 114 has fast thereon an eccentrically adjustable stud 118 whereby to restore the control lever 66. Whenever the slide 95 is in the normal position seen in Figure 1, the stud 118 of the restorer arm 114 lies clear above the control lever 66, and this is the case whether the lever 66 is in the open or closed clutch position. Incidental to a last part of the operation of the slide 95 from the Figure 1 to the Figure 4 position, as effected by the margin stop lug face 90 contacting and moving the dog 92, the arm 114 by its stud 118 restores the carriage return control lever 66 slightly beyond the normal open clutch position, as illustrated in Figure 4, wherefore the carriage ceases to be driven by the return drive before the carriage has fully returned. The restoring movement imparted to the lever 66 is slightly excessive in order that either the carriage return tripping latch 68 or a supplementary latch 68a, see Figure 3, will reliably catch over the restored lever 66 to detain it in open-clutch position pending the next operation of the carriage return key 69. The said latches 68 and 68a are conventional, the latter having an interim function to catch over the restored lever 66 if the return key 69 is still held depressed. When then subsequently the return key is restored, the tripping latch 68 is substituted for the supplementary latch 68a.

After the carriage returns slightly further than is shown in Figure 4, the dog 92 being further deflected upwardly slips off the lug face 90 of the margin stop 21 and the parts 92 to 98 and 105 restore automatically, under the tension of the spring 116, as explained hereinbefore.

The lug 88 has preferably an ear 124 extending beyond the face 90 and coming to lie behind the rounded dog extremity 91, thereby to prevent such dog from accidentally yielding rearwardly off the lug face 90. The ports of the dash-pot are regulated so that during actuation of the slide 95 the carriage speed is reduced softly but radically so that after the clutch 57, 58 is open the carriage has still a residue of momentum sufficient to assure a concluding movement to the return limit. This adjustment is not critical and by the described arrangement and structure, a very soft and shockless arrest of the carriage results at the end of each carriage return wherein due to substantial return travel the carriage attains an appreciable speed. It is to be observed that because the carriage ceases to be power driven at a point before the return limit is reached, its speed is not required to be reduced as much and to such critical degree as would be necessary for reasonably quiet arrest, if the shut-off action occurred closer to the end of the return movement and by power movement of the carriage.

During the effected slow-down of the returning carriage, while the clutch 57, 58 for an instant still remains closed, the aforestated slip clutch 56 allows the stated reduction of speed of the carriage independently of the electric motor 54. Therefore, the carriage return mechanism including the drawband 35 is not subjected to undue strain while the returning speed of the carriage is reduced.

Figure 9 shows the margin stop 21 in the return limit position having carried the counter stop 23 to the left limit of the perforation 19 in the plate 22, as viewed in such figure. However, the carriage, after said margin stop 21 has reached the limit position of Figure 9, will advance a partial letter-feed space under the urge of a usual carriage feed spring, not shown, such advance occurring automatically under control of an escapement mechanism of conventional structure, shown in Figure 6.

The said escapement mechanism comprises an escapement wheel 125, unitary with a pinion 126, and turnably carried in the framework of the machine. A rack 127, supported for movement with the carriage, is normally in mesh with the pinion 126. Therefore, movement of the carriage in advance direction turns the escapement wheel 125 counterclockwise, and return travel turns it clockwise. An escapement dog 128 pivotally carried at 130 on a rocker 131, by cooperation with the teeth of the wheel 125, is normally effective to hold the carriage, against advance by the carriage feed spring, in various feed positions. At each typing operation the rocker 131 is vibrated transversely to the wheel 125 and causes one tooth of the wheel 125 to escape the dog 128 thereby letter-feeding the carriage. In the specific showing of Figure 6, the escapement wheel 125 has been rotated clockwise by a return movement of the carriage to the limit shown in Figure 9, namely a little less than one tooth or feed-space beyond the desired initial letter-feed position. Immediately thereafter the carriage feed spring will reverse the movement of the carriage, advancing it a partial feed step to the limit established by the next escapement wheel tooth stopping against the dog 128. The carriage thereby becomes accurately located in initial typing position. A usual transitory control dog is fragmentarily indicated at 132.

The invention provides that carriage returns below a certain magnitude do not involve an operation of the described dash-pot slow-down device, and instead of the clutch 57, 58 being opened early by the described primary carriage-return shut-off mechanism, it is opened late as the carriage reaches its return limit. Thus a reliable and full movement of the carriage to the limit of the return is assured and, on the other hand, because of the shortness of the return run, the carriage is not sufficiently accelerated to present a shock and noise problem. Specifically, the structure is such that in connection with short returns the shut-off reaction is effected as the carriage in its return over-travels the line-start position and moves to the full limit.

All carriage returns, whether short or long, are instituted by tripping the latch 68 to cause a clutch-closing movement of the lever 66. It has been stated hereinbefore that whenever the lever 66 is so moved, the counterstop 23 moves from the side of the perforation engaged thereby in Figure 1, to the opposite side. When a carriage return, due to its shortness does not involve the primary shut-off mechanism, that is whenever the carriage is started on its return run from a position wherein the margin stop lug 88 has not been advanced past the dog 92 of the primary shut-off mechanism, the shut-off action is effected by the margin stop face 32 riding against the counterstop 23 and displacing it to the limit of the perforation in the plate 22 to the position seen in Figure 9. The primary shut-off device having remained idle, such movement of the counterstop 23 restores the lever 66 to open-clutch position through the medium of the pin 72 and the link 71. The latches 68 and 68a are then again effective to hold the lever 66 in open-clutch position pending a new operation of the carriage return key 69.

The described mechanism whereby in connection with relatively short carriage returns the shut-off action results immediately before the carriage reaches the return limit, may be regarded to constitute a secondary shut-off mechanism, in distinction from the named primary shut-off mechanism.

Each time the control lever 66 is tripped to close the return clutch, the drawband 35 operates first the line-space mechanism shown in Figure 2, and then proceeds to draw the carriage toward the return limit. The operation is the same if the lever 66 is tripped while the carriage is in the initial typing position, and in that case the short, limited, powered movement of the carriage equivalent to about ¾ letter-feed space will reliably open the clutch 57, 58, the carriage thereafter advancing under the control of the described escapement dog 128 to the exact initial typing position.

The primary and secondary shut-off mechanisms, functioning as stated, provide for accurate, reliable and quietly terminated return runs regardless of length. The mechansim functions with perfection for carriages of greatly differing lengths and weight. Because the carriage concludes its return run always at moderate speed, it, in being arrested at the end of greatly varying return runs, will have practically no variable flexing effect on the parts of the machine, wherefore the overrun movement of the carriage beyond the intended line-start position is so constant, that the escapement will never fail to gain accurate control over the carriage, that it will cause the carriage to settle in the exact line-start position.

Moreover, the mechanism functions with perfection for very small pitch letter-feed machines. Long carriage returns which are most frequent are terminated by a final coasting of the carriage softly to the limit, while incident to short returns and line-spacing operations the power shut-off occurs reliably by a final power-movement of the carriage.

In Figure 1 there is shown a second return terminating margin stop 21a which reaches lower than the margin stop 21. Return runs are terminated under control of this margin stop 21a if the counterstop 23 in accompaniment to a clutch closing movement of the control lever 66, in a known manner, is given a position just below the level of the lower tip of the margin stop 21. In a so instituted carriage return, the carriage will be slowed down as the lug 88 on the margin stop 21 carries the dog 92 therewith and the carriage thus comes under the speed reducing influence of the dash-pot. Moreover, as the dog 92 is carried along the clutch 57, 58 is opened by the primary shut-off mechanism. In a moment thereafter the dog 92 becomes automaticaly divorced from the lug 88. Quick return of the slide 95 and the dog 92 is facilitated by a provision of a flap valve 122 associated with a passage 123 in the piston 75, such flap valve 122 opening automatically during the return stroke of the piston due to a pressure build-up on the piston side facing the cylinder end 81. After the divorcement of the lug the carriage becomes again freely power driven, and the margin stop 21 passes over and beyond the counterstop 23. During the resumed power return movement, a lug 88a on the margin stop 21a meets the dog 92, actuating it and the slide 95 in the same manner as explained in connection with the margin stop 21, the speed of the carriage therefore becoming rapidly reduced. Then, before the margin stop 21a encounters the counterstop 23, the dog 92 becomes deflected out of operative alignment with the lug 88a, and the carriage completes its return run by reason of a residue of momentum.

In the event the carriage is first returned to the limit of the margin stop 21, it is obvious that it may then be further returned to the limit of the margin stop 21a by again operating the return key 69.

The mechanism has been described in connection with effecting returns of the carriage, but it is obvious that some of the princinples of the invention are similarly applicable for power tabulating a carriage. It is to be understood, also, that the primary carriage return shut-off mechanism and the carriage slow-down device may be constructed as independent mechanisms with independent timing for operation.

Having explained the nature and the objects of the invention and having specifically described the machine embodying the invention in its preferred form, what is claimed is:

1. In a machine of the class described having a carriage movable in opposite directions on a frame; a normally idle power mechanism to move the said carriage in at least one of said directions, and means to render said power mechanism active and inactive, comprising a primary and a secondary shut-off means, said primary shut-off means being responsive to travel of the carriage in said one direction through a zone short of a carriage travel limit, but not itself limiting carriage travel, whereby the carriage is adapted to coast along after said response of the primary shut-off means, said secondary shut-off means being responsive to travel of the carriage in said one direction at the immediate approach of said travel limit whenever said power mechanism is rendered active in a position of the carriage so that said primary shut-off means will not respond.

2. The invention set forth in claim 1, and means operatively associated with said primary shut-off means to cause the carriage to reduce its speed while it is traveling through said zone.

3. In a machine of the class described having a carriage movable in opposite directions on a frame; a normally idle power mechanism to move the said carriage in at least one of said directions, and means to render said power mechanism active and inactive, comprising a primary and a secondary shut-off means, said primary shut-off means being responsive to travel of the carriage in said direction through a zone in approach and short of a carriage travel limit, but not limiting carriage travel, whereby the carriage is adapted to coast along after the response of the primary shut-off means, said secondary shut-off means comprising a stop on the frame and a stop on the carriage, one of said stops engageable and movable to a limit by the other through travel of the carriage in said one direction and thereby affording said carriage travel limit, said secondary shut-off means responsing to said movement of said engageable stop for shut-off action if said power mechanism is rendered active in a position of the carriage so that said primary shut-off means remains inactive.

4. In a machine of the class described, having a carriage movable in opposite directions on a frame; a normally idle power mechanism to move the said carriage in at least one of said directions, means to render said power mechanism active, a stop on the frame, a stop on the carriage, said stops adapted by encounter of one with the other adapted to limit the carriage in its movement in the said one direction, a device operable for slow-down effect on the carriage, spring means to restore said device, an element for operating said device, said device and said element being oppositely on the frame and the carriage, said device correlated with said element for operation to have slow-down effect on the carriage as the latter is moved in the said one direction through a zone in approach of but short of said encounter of said one stop with the other, means automatically controlled by the carriage to disconnect operatively said device from said element after receipt of operating motion and before the carriage is arrested by said stops, and means to render said power mechanism inactive by the operation of said device, the slow-down effect of said device on the carriage being of a degree for the carriage after disconnection of said device to coast softly to the limit afforded by said stops, and said spring means restoring the disconnected device immediately.

5. In a machine of the class described, having a carriage movable in opposite directions on a frame; a normally idle power mechanism to move the said carriage in at least one of said directions, means to render said power mechanism active, a stop on the frame, a stop on the carriage, one of said stops engageable and movable to a limit by the other through movement of the carriage in said one direction and thereby limiting such movement of the carriage, a dash-pot device operable for decelerating effect on the carriage, spring means biasing said device to restore, an element for operating said device, said device and said element being oppositely on the frame and the carriage, said device correlated with said element for operation to have decelerating effect on the carriage as the latter is moved in the said one direction through a zone in approach of but short of the engagement of said stops, means automatically controlled by the carriage to disconnect said device operatively from said element as the device becomes operated and before said stops engage, whereby said spring means consequently restores said device, means to render said power mechanism inactive resultant to the operation of said device, the decelerating effect of said device on the carriage being of a degree for the carriage after disconnection of said device to coast softly to the limit afforded by said stops, and means to render said power mechanism automatically inactive by said movement of said one stop by the other if the power mechanism is rendered active for a movement of the carriage which is too short to effect an operation of said device.

6. In a machine of the class described having a carriage movable on a frame; a normally idle power-return mechanism, control means for said return mechanism including a return terminating margin stop on the carriage and a counterstop on the frame, the latter engageable and limitedly displaceable by the margin stop in the return travel of the carriage to a given position for shut-off action on the power-return mechanism and to arrest the carriage, a device on the frame arranged for operation by said margin stop to decelerate the carriage as the latter is returned through a zone in approach of the engagement of said stops, means to disconnect operatively said device from said margin stop after receipt of operating motion and before the carriage is arrested by said stops, and means to effect a shut-off action of the power-return mechanism by the operation of said device.

7. In a machine of the class described having a carriage movable on a frame; a normally idle power-return mechanism, control means for said return mechanism including a return terminating margin stop on the carriage and a counterstop on the frame, the latter engageable and limitedly displaceable by the margin stop in the return travel of the carriage to a given position for shut-off action on the power-return mechanism and to arrest the carriage, a device on the frame arranged for operation by said margin stop to decelerate the carriage as the latter is returned through a zone in approach of the engagement of said stops, means to disconnect operatively said device from said margin stop after receipt of operating motion and before the carriage is arrested by said stops, and means to effect a shut-off action of the power-return mechanism by the operation of said device, said disconnecting means comprising a lug on the frame and a part operable by said device and by engagement with said lug adapted to disconnect automatically said device from said margin stop.

8. In a machine of the class described having a carriage advanceable and returnable on a frame; means constantly urging the carriage to advance, an escapement mechanism to control the advance of the carriage and comprising a toothed feed member and a dog, the latter by cooperation with uniformly spaced teeth of said member adapted to hold the carriage in different feed positions against advance, a normally idle power means to return the carriage, means limiting the return of the carriage beyond an intended initial feed position less than by one feed position, and control means for said carriage return means including a primary and a secondary shut-off means, said primary shut-off means being responsive only to the carriage returning past a certain point in advance of the return limit position, and said secondary shut-off means being responsive to carriage return travel started near to the return limit so as not to affect the said primary shut-off means, the carriage after each response of said primary shut-off means coasting to said return limit by power of momentum, and each time after reaching said return limit being advanced automatically by said urging means to said intended initial feed position.

9. In a machine of the class described having a carriage advanceable and returnable on a frame and having a line-spacing mechanism; means constantly urging the carriage to advance, an escapement mechanism to control the advance of the carriage and comprising a toothed feed member and a dog, the latter by cooperation with uniformly spaced teeth of said member adapted to hold the carriage in different feed positions against advance, a normally idle power means to return the carriage and of a kind to operate first said line-spacing mechanism and then to return the carriage, means limiting the return of the carriage beyond an intended initial feed position less than by one feed position, and control means for said carriage return means including a primary and a secondary shut-off means, said primary shut-off means being responsive only to the carriage returning past a certain point in advance of the return limit position, and said secondary shut-off means being responsive always to carriage return travel commencing while said carriage is in the said initial feed position, the carriage after each response of said primary shut-off means coasting to said return limit by power of momentum, and each time after reaching said return limit being advanced automatically by said urging means to said intended initial feed position.

10. In a machine of the class described having a carriage advanceable and returnable on a frame; means constantly urging the carriage to advance, an escapement mechanism to control the advance of the carriage and comprising a toothed feed member and an escapement dog, the latter by cooperation with evenly spaced teeth on said feed member adapted to hold the carriage in different feed positions against advance, a line-spacing means, a normally idle power-return means for the carriage of a kind to first operate said line-spacing means and then to return the carriage, and control means for said power return means, including a return limiting margin stop and a related counterstop, said stop and counterstop oppositely supported on the frame and the carriage, said counterstop operable by said margin stop for shut-off action on said power-return means through return travel of the carriage less than one feed position beyond an intended initial feed position, said control means further including means controlled by the carriage to have shut-off action on said power-return means as the carriage is power-returned through a zone in approach of and short of the return limiting engagement of said stop and counterstop, the carriage after said shut-off action, urged by said urging means, advancing under control of said dog to the said intended initial feed position.

11. In a machine of the class described having a carriage advanceable and returnable on a frame; means constantly urging the carriage to advance, an escapement mechanism to control the advance of the carriage and comprising a toothed feed member and an escapement dog, the latter by cooperation with evenly spaced teeth on said feed member adapted to hold the carriage in different feed positions against advance, a line-spacing means, a normally idle power-return means for the carriage of a kind to first operate said line-spacing means and then to return the carriage, control means for said power-return means, including a return limiting margin stop and a related counterstop, said stop and counterstop oppositely supported on the frame and the carriage, said counterstop operable by said margin stop for shut-off action on said power-return means through return travel of the carriage less than one feed position beyond an intended initial feed position, and carriage controlled means to decelerate the carriage as it is power-returned through a zone in advance of the return limiting engagement of said stop and counterstop, said control means further including means controlled by the carriage to have shut-off action on said power-return means while the carriage returns through said zone, said decelerating means having such decelerating effect that the carriage will finally coast softly to the limit afforded by said stop and counterstop, and the carriage, urged by said urging means and controlled by said dog, advancing automatically to said intended initial feed position after reaching the return limit.

References Cited in the file of this patent

UNITED STATES PATENTS

| | | |
|---|---|---|
| 2,283,565 | Michelsen | May 19, 1942 |
| 2,315,992 | Von Reppert | Apr. 6, 1943 |